US008902905B2

(12) United States Patent
Chin et al.

(10) Patent No.: US 8,902,905 B2
(45) Date of Patent: Dec. 2, 2014

(54) AREA UPDATE PROCEDURES FOR A MULTIPLE USIM MOBILE TERMINAL

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 13/087,232

(22) Filed: Apr. 14, 2011

(65) Prior Publication Data

US 2012/0020287 A1      Jan. 26, 2012

Related U.S. Application Data

(60) Provisional application No. 61/366,131, filed on Jul. 20, 2010.

(51) Int. Cl.
*H04L 12/56* (2006.01)
*H04W 60/00* (2009.01)
*H04W 60/02* (2009.01)

(52) U.S. Cl.
CPC .............. *H04W 60/00* (2013.01); *H04W 60/02* (2013.01); *H04W 60/005* (2013.01)
USPC .......................................... 370/400; 370/392

(58) Field of Classification Search
USPC ......... 370/328–329, 331, 335–336, 342–343, 370/345, 400–401, 437, 441–443, 465, 370/479–480, 498
See application file for complete search history.

(56) References Cited

U.S. PATENT DOCUMENTS

| | | | |
|---|---|---|---|
| 6,556,820 B1 * | 4/2003 | Le et al. ........................ | 455/411 |
| 7,103,662 B2 * | 9/2006 | Ray et al. ....................... | 709/225 |
| 7,697,935 B2 * | 4/2010 | Guyot et al. ................... | 455/443 |
| 7,995,493 B2 * | 8/2011 | Anderlind et al. ............ | 370/252 |
| 8,238,267 B2 * | 8/2012 | Dwyer et al. .................. | 370/254 |
| 8,249,017 B2 * | 8/2012 | Chen et al. ..................... | 370/331 |
| 8,259,659 B2 * | 9/2012 | Luft et al. ...................... | 370/329 |
| 8,260,743 B2 * | 9/2012 | Suojasto ........................ | 707/631 |

(Continued)

FOREIGN PATENT DOCUMENTS

| | | |
|---|---|---|
| GB | 2439370 A | 12/2007 |
| WO | 0119098 A2 | 3/2001 |
| WO | 0119119 A1 | 3/2001 |

OTHER PUBLICATIONS

Digital cellular telecommunications system (Phase 2+); Universal Mobile Telecommunications System (UMTS); General Packet Radio Service (GPRS); Service description; Stage 2 (3GPP TS 23.060 version 9.5.0 Release 9 ) , Technical Specification, European Telecommunications Standards Institute (ETSI), 650, Route Des Lucioles ; F-06921 Sophia-Antipolis ; France, vol. 3GPP SA 2, No. V9.5.0, Jul. 1, 2010, XP014047170, pp. 51, 52,77-79,95-98,131.

(Continued)

*Primary Examiner* — Kevin Mew
(74) *Attorney, Agent, or Firm* — Kristine U. Ekwueme

(57) ABSTRACT

Certain aspects of the present disclosure relate to a method for improving location area and routing area update procedures in a multiple-USIM mobile terminal. A technique is provided for allowing the mobile terminal to reduce update procedures by using a message for multiple USIMs. The discussed technique reduces the number of messages exchanged and CPU processing.

56 Claims, 8 Drawing Sheets

(56) References Cited

U.S. PATENT DOCUMENTS

| | | | |
|---|---|---|---|
| 8,275,389 B2* | 9/2012 | Jung et al. | 455/455 |
| 8,401,553 B2* | 3/2013 | Nylander et al. | 455/435.1 |
| 8,750,220 B2* | 6/2014 | Xie et al. | 370/329 |
| 2003/0130008 A1* | 7/2003 | Rajaniemi et al. | 455/551 |
| 2005/0083913 A1* | 4/2005 | Choi et al. | 370/352 |
| 2010/0128685 A1* | 5/2010 | Jiang | 370/329 |
| 2010/0167755 A1* | 7/2010 | Kim et al. | 455/456.1 |
| 2010/0272069 A1* | 10/2010 | Hu | 370/331 |
| 2011/0026469 A1* | 2/2011 | Wu | 370/329 |
| 2012/0264425 A1* | 10/2012 | Krishnamoorthy et al. | 455/434 |
| 2013/0295920 A1* | 11/2013 | Viswanadham et al. | 455/426.1 |

OTHER PUBLICATIONS

International Search Report and Written Opinion—PCT/US2011/040396—ISA/EPO—Mar. 12, 2011.

* cited by examiner

| Information element | Type/Reference | Presence |
|---|---|---|
| Mobility management Protocol discriminator | Protocol discriminator | Mandatory |
| Skip Indicator | Skip Indicator | Mandatory |
| Location Updating Message Type | Request message type | Mandatory |
| ... | ... | |
| Mobile identity | Mobile identity | Mandatory |
| ... | ... | ... |
| Additional mobile identity-1 | Mobile identity | Optional |
| ... | ... | Optional |
| Additional mobile identity-k | Mobile identity | Optional |

FIG. 8

| Information element | Type/Reference | Presence |
|---|---|---|
| Mobility management Protocol discriminator | Protocol discriminator | Mandatory |
| Skip Indicator | Skip Indicator | Mandatory |
| Routing Area Update Message Type | Request message type | Mandatory |
| ... | ... | |
| P-TMSI | Mobile identity | Mandatory |
| ... | ... | ... |
| Additional mobile identity-1 | Mobile identity | Optional |
| ... | ... | Optional |
| Additional mobile identity-k | Mobile identity | Optional |

AREA UPDATE PROCEDURES FOR A MULTIPLE USIM MOBILE TERMINAL

CLAIM OF PRIORITY UNDER 35 U.S.C. §119

The present application for patent claims benefit of Provisional Application Ser. No. 61/366,131, filed Jul. 20, 2010, and assigned to the assignee hereof and hereby expressly incorporated by reference herein.

BACKGROUND

1. Field

Aspects of the present disclosure relate generally to wireless communication systems, and more particularly, to area update procedures for mobile terminals.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communication is provided. The method generally includes generating an area update message comprising a first indication of a first SI supported by the UE and a second indication of a second SI supported by the UE and transmitting the area update message.

In an aspect of the disclosure, a method of wireless communication is provided. The method generally includes receiving, from a user equipment (UE) that supports multiple Subscriber Identities (SIs), an area update message and processing the area update message to obtain therefrom a first indication of a first SI supported by the UE and a second indication of a second SI supported by the UE.

In an aspect of the disclosure, an apparatus for wireless communication is provided. The apparatus generally includes means for generating an area update message comprising a first indication of a first SI supported by the UE and a second indication of a second SI supported by the UE and means for transmitting the area update message.

In an aspect of the disclosure, an apparatus for wireless communication is provided. The apparatus generally includes means for receiving, from a user equipment (UE) that supports multiple Subscriber Identities (SIs), an area update message and means for processing the area update message to obtain therefrom a first indication of a first SI supported by the UE and a second indication of a second SI supported by the UE.

In an aspect of the disclosure, a computer program product comprising a computer-readable medium is provided. The computer-readable medium generally includes code for generating an area update message comprising a first indication of a first SI supported by the UE and a second indication of a second SI supported by the UE and transmitting the area update message.

In an aspect of the disclosure, a computer program product comprising a computer-readable medium is provided. The computer-readable medium generally includes code for receiving, from a user equipment (UE) that supports multiple Subscriber Identities (SIs), an area update message and processing the area update message to obtain therefrom a first indication of a first SI supported by the UE and a second indication of a second SI supported by the UE.

In an aspect of the disclosure, an apparatus for wireless communication comprising at least one processor and a memory coupled to the at least one processor is provided. The at least one processor is generally configured to generate an area update message comprising a first indication of a first SI supported by the UE and a second indication of a second SI supported by the UE and transmit the area update message.

In an aspect of the disclosure, an apparatus for wireless communication comprising at least one processor and a memory coupled to the at least one processor is provided. The at least one processor is generally configured to receive, from a user equipment (UE) that supports multiple Subscriber Identities (SIs), an area update message and process the area update message to obtain therefrom a first indication of a first SI supported by the UE and a second indication of a second SI supported by the UE.

BRIEF DESCRIPTION OF THE DRAWINGS

FIG. 8 is a table illustrating an example message format in accordance with aspects of the present disclosure.

FIG. 9 is another table illustrating an example message format in accordance with aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
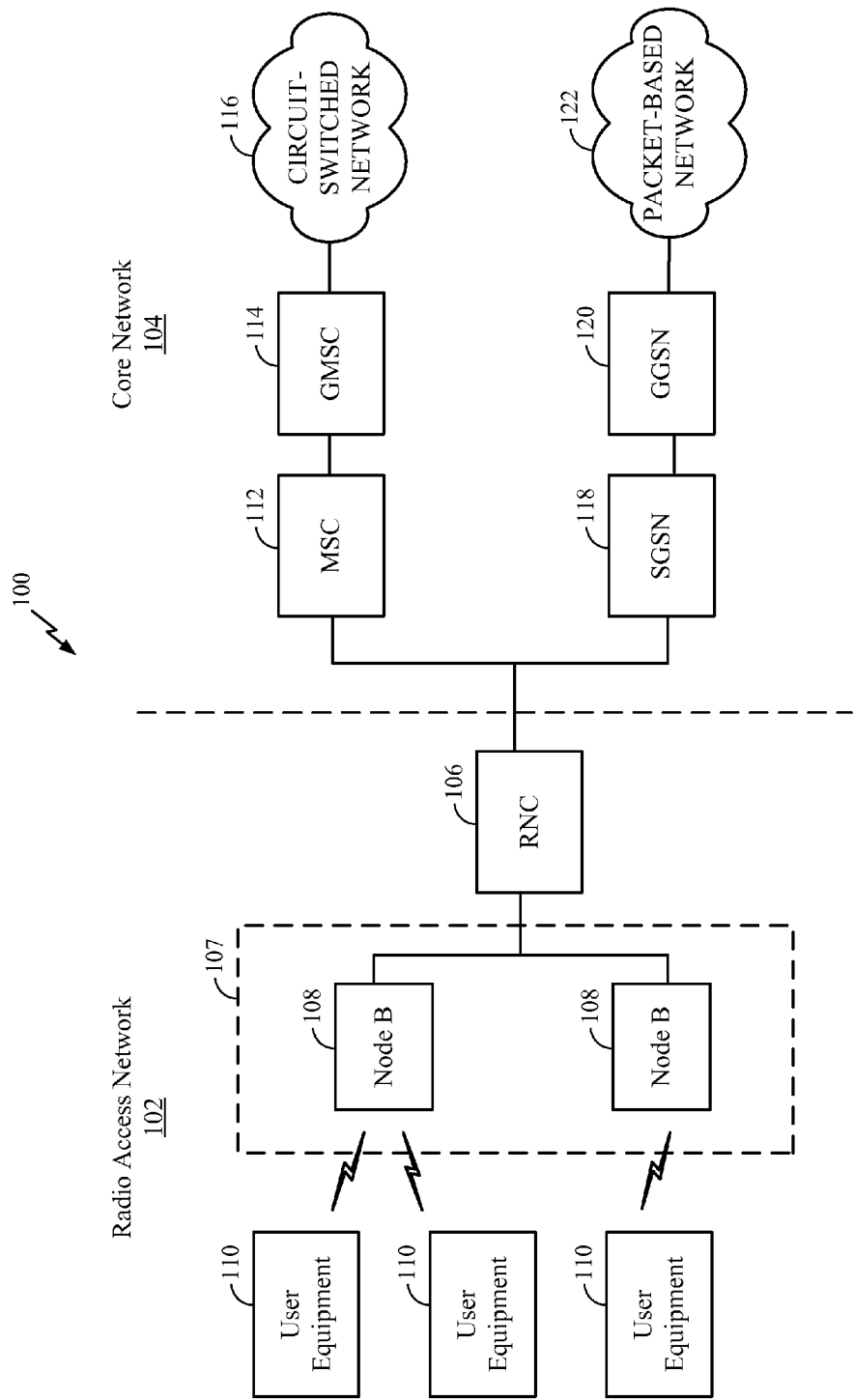
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
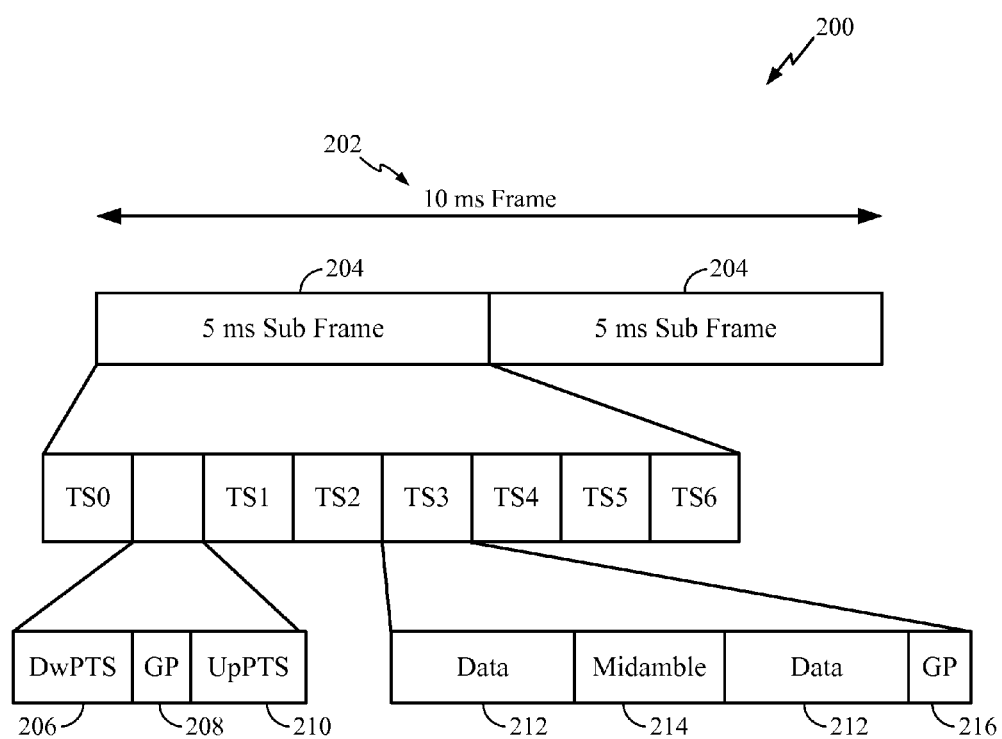
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. Various update messages, described herein, may be transmitted in any of the time slots allocated for uplink communication.

A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
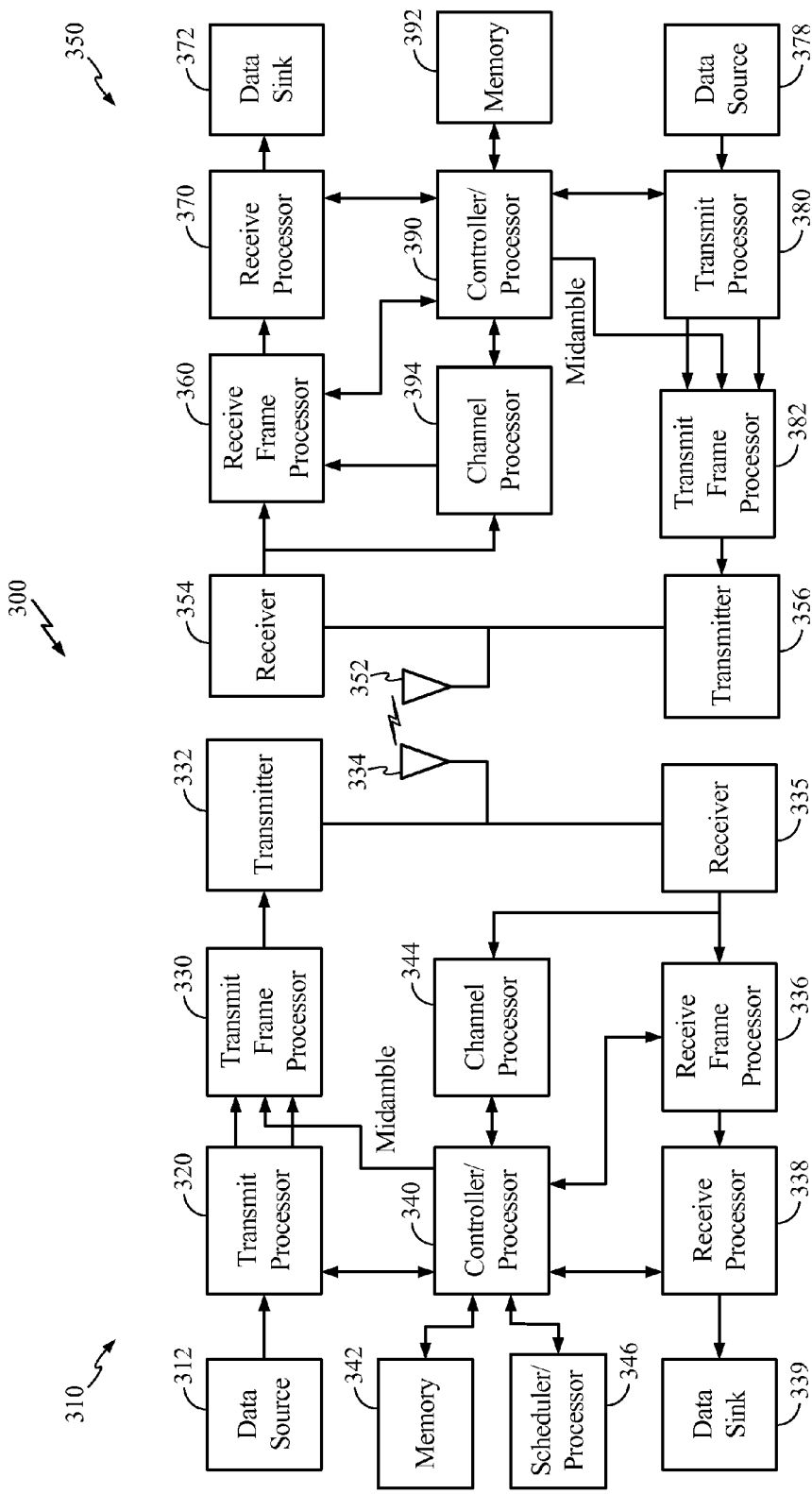
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

According to one aspect of the invention, at the UE, the controller/processor 390 may be configured to support multiple Subscriber Identities (SIs). In one aspect, the controller/processor 390 may generate an area update message comprising a first indication of a first subscriber identity supported by the controller/processor 390 and a second indication of a second SI supported by the controller/processor 390. The transmitter 356 may transmit the generated area update message. The receiver 354 may receive a timer value. The controller/processor 390 may use the timer value to indicate when to periodically transmit the area update message for the first and second SIs.

According to another aspect, at the Node B, a receiver 335 may receive, from a UE that supports multiple SIs, an area update message comprising a first indication of a first SI supported by the UE and a second indication of a second SI supported by the UE. In one aspect, the controller/processor 340 may retrieve the first of the first SI and second indication of the second SI supported by the UE. The transmitter 332 may transmit an acknowledgement of the area update message. The transmitter 332 may further transmit a timer value indicating when to periodically transmit the area update message for the first and second SIs.

Location Area and Routing Area Update Procedures in a Multiple USIM TD-SCDMA Mobile Terminal In some countries, for example, China, it is popular to have a mobile phone support more than one Universal Subscriber Identity Module (USIM), whereby a user may make a phone call using different phone numbers. Each USIM has a unique International Mobile Subscriber Identity (IMSI), which is used to identify a mobile phone user within a mobile network. In one aspect, an IMSI may be encoded in a smart card inserted into a mobile phone.

In a mobile network, such as a TD-SCDMA system, each Node B covers a geographical area which is part of a "location area" uniquely identified by a Location Area Identity (LAI). In one aspect, the LAI may be a "location area code" broadcast periodically by Node Bs. The mobile network integrates the coverage of each Node Bs to provide radio coverage over a wider area. For packet switched services, a "routing area" may be used to more accurately locate a mobile phone within an area than could be done with a circuit-switched network. In one aspect, a "routing area" is a subdivision of a location area. As a mobile phone moves from one location area to the next, the mobile phone may perform mobility procedures (i.e. area update procedures) to inform the network of its new location.

Figure 4:
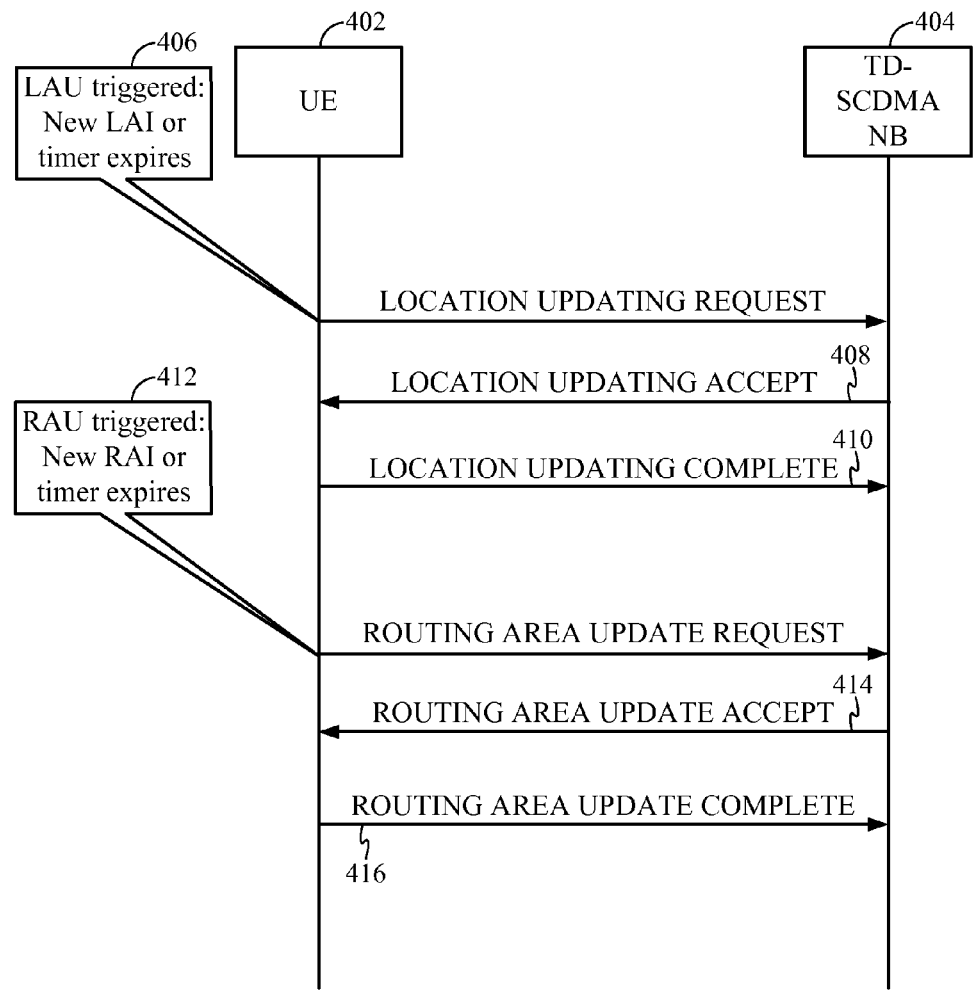
FIG. 4 is a sequence diagram illustrating an example of a UE in communication with a Node B in a telecommunications system.

FIG. 4 is a sequence diagram illustrating an example of a UE 402 performing area update procedures with a TD-SCDMA Node B 404. In one aspect, a UE may perform a location area update (LAU), which a UE sends a "LOCATION UPDATING REQUEST" message to a MSC/VLR when certain conditions are triggered. Generally, LAU is required for circuit switched domain service and is needed to receive incoming voice calls. At 406, a LAU is triggered at the UE 402. In one aspect, a LAU is triggered when a UE determines it is in a new location area (i.e. it is in a TD-SCDMA cell with a LAI is different from the LAI where UE last performed a LAU.). In another aspect, a LAU is triggered when a periodic timer to perform LAU expires.

As such, at 406, the UE 402 may transmit a location updating request message to the TD-SCDMA NB 404. In one aspect, the location updating request message may include a mobile identifier corresponding to the UE 402. The mobile identifier may be an IMSI or a temporary mobile subscriber identity (TMSI). A TMSI is an identifier that is commonly used in communication between a UE and a wireless network to avoid the disclosure of a user's IMSI to third parties. The TMSI is generated and randomly assigned by the VLR to every UE in an area. The TMSI is local to a location area, and may be updated each time a UE moves to a new area.

At 408, responsive to the location updating request, the Node B 404 may transmit a "location updating accept" message, indicating that the Node B 404 has accepted the location updating request message. At 410, the UE 402 may finally respond with a "location requesting complete" message, concluding the LAU procedure.

According to another aspect, a UE 402 may perform a routing area update (RAU) procedure, in which the UE 402 sends a "ROUTING AREA UPDATE REQUEST" message to the Serving GPRS Support Node (SGSN) when certain conditions are triggers. Generally, RAU is required for packet switched domain service and are needed to receive incoming packet calls. Turning again to FIG. 4, at 412, a RAU is triggered at the UE 402. In one aspect, a RAU is triggered when the UE determines it is in a new routing area (i.e. it is in a TD-SCDMA cell with a different routing area identity (RAI) than the RAI where UE last performed a RAU.) In another aspect, a LAU is triggered when a periodic timer to perform RAU expires.

As such, at 412, a UE 402 may transmit a "routing area update request" message to the Node B 404. In one aspect, the routing area update request message may include a mobile identifier corresponding to the UE 402. At 414, responsive to the routing area update request message, the Node B may transmit a "routing area update accept" message, indicating that the Node B 404 has accepted the routing area update request. Finally, at 416, the UE 402 may transmit a "routing area update complete" message to the Node B 404, concluding the RAU procedure.

UEs with multiple USIMs, as mentioned above, may have to perform LAU and RAU procedures individually for each USIM/IMSI. These procedures increase processing needs and performance overhead even though all the procedures originate from the same mobile station. A technique is therefore provided to reduce the procedures performed and the messages exchanged. According to one aspect, multi-USIM mobile phones may perform a combined LAU for the multiple USIMs/IMSIs and/or a combined RAU for the multiple USIMs/IMSIs.

For example, FIG. 4 illustraes an example UE 410 with multiple SIs (USIMs or IMSIs) capable of performing a combined AU (LAU or RAU). As illustrated, the UE 410 may include an AU message generating module 514 configured to generate an AU message with multiple SIs. The AU message generating module 514 may provide the AU message to a transmitter module 512 for transmission to a base station 520.

As illustrated, the base station 520 may include a receiver module 526 that receives the AU message from the UE 510. The receiver module 526 may provide the AU message to an AU message processing module 524 configured to process the AU message, obtaining the multiple SIs therefrom and performing an area update therefor. As illustrated, upon successful processing of the AU message, the AU message processing module 524 may optionally generate an ACK message. The AU message processing module 524 may provide the ACK message to a transmitter module 522 for transmission to the UE 510. A receiver module 516 at the UE 510 may receive the ACK message and provide an indication to the AU message generation module 514 that the AU message was successfully received by the base station 520.

Figure 5:
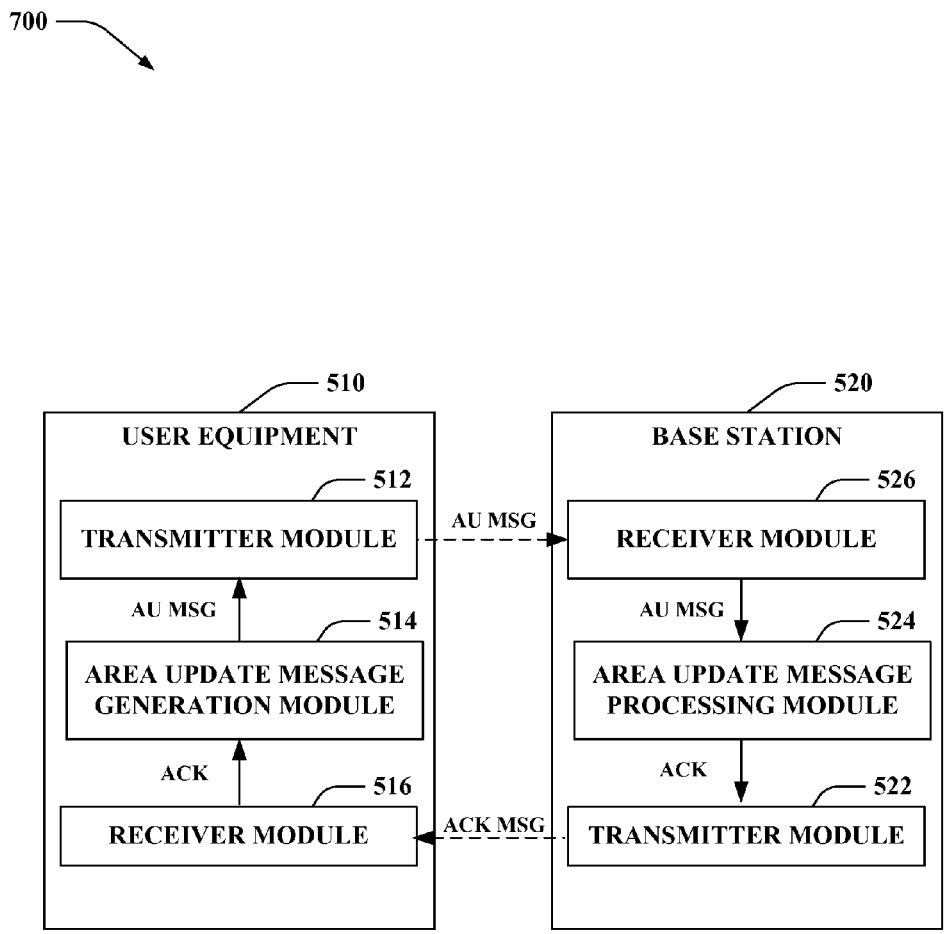
FIG. 5 illustrates example components capable of implementing techniques presented herein.
Figure 6:
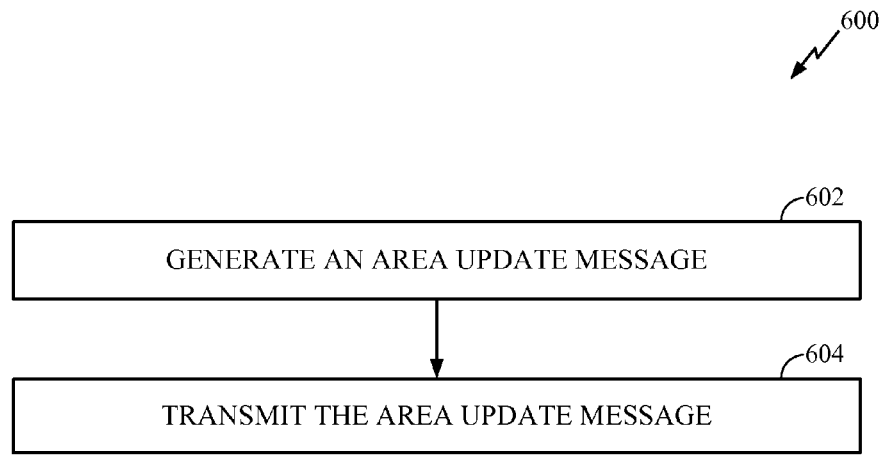
FIG. 6 is a functional block diagram conceptually illustrating example blocks executed to implement the functional characteristics of one aspect of the present disclosure.

FIG. 6 is a functional block diagram 600 illustrating example blocks executed in conducting wireless communication according to one aspect of the present disclosure. In one aspect, a UE (such as UE 510 of FIG. 5) may perform a locating updating request procedure by transmitting a message including multiple mobile identities, each corresponding to a USIM. In block 602, a UE may generate an area update message. According to certain aspects, the area update message may comprise a first indication of a first subscriber identity (SI) supported by the UE and a second indication of a second SI supported by the UE. The area update message may further include an indication of at least a third SI supported by the UE. In one aspect, the area update message may be a location area update request message. The first and second indications from the location area update request message may be at least one of an IMSI or a TMSI. In another aspect, the area update message may be a routing area update request message. The first and second indications from the routing area update request message may be an IMSI or a packet temporary mobile subscriber identity (P-TMSI).

Furthermore, at block 604, the UE may transmit the area update message, for example, to a base station, such as a Node B. In one aspect, the UE may also receive an acknowledgement of the area update message from the Node B. The UE may further receive a timer value indicating when to transmit the area update message for the first and second SIs. For example, the timer value may be used to initate a periodic timer, the expiration of which triggers area updates.

Figure 7:
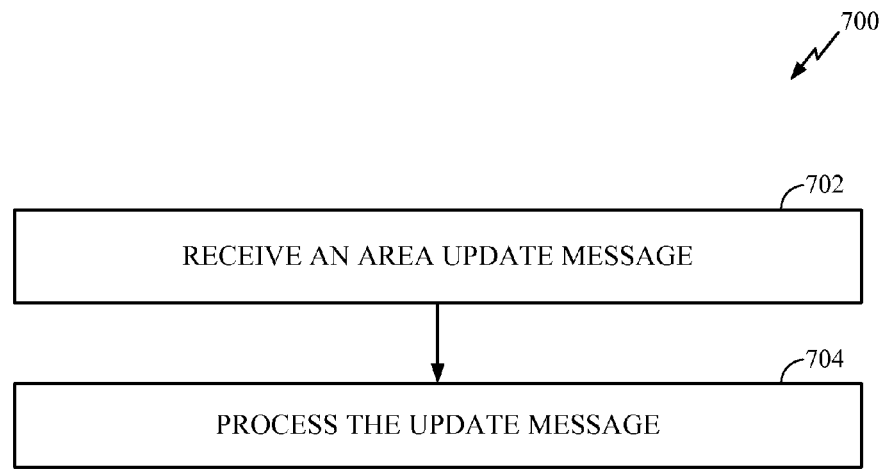
FIG. 7 is a functional block diagram conceptually illustrating example blocks executed to implement the functional characteristics of one aspect of the present disclosure.

Similarly, FIG. 7 is a functional block diagram 700 illustrating example blocks executed in conducting wireless communication according to one aspect of the present disclosure. In one aspect, a base station (such as base station 520 of FIG. 5, which may be a Node B) may perform a locating updating request procedure with a UE by receiving a message including multiple mobile identities, each corresponding to a USIM. In block 702, a base station may receive, from a UE, an area update message. As noted above, the area update message may comprise a first indication of a first subscriber identity (SI) supported by the UE and a second indication of a second SI supported by the UE. The area update message may further include an indication of at least a third SI supported by the UE. In one aspect, the area update message may be a location area update request message. The first and second indications from the location area update request message may be at least one of an IMSI or a TMSI. In another aspect, the area update message may be a routing area update request message. The first and second indications from the routing area update request message may be an IMSI or a packet temporary mobile subscriber identity (P-TMSI).

Furthermore, at block 704, the base station may process the area update message. For example, the base station may process the area update message to obtain the first and second indications of subscriber identities from the received area update message. In one aspect, the Node B may transmit a timer value indicating when to transmit transmit the area update message for the first and second SIs. For example, the timer value may be used to initiate a periodic timer used to trigger periodic transmission of the area update message, upon its expiration. In one aspect, the Node B may also transmit an acknowledgement of the area update message to the UE.

In one aspect, the LOCATION UPDATING REQUEST message described above may be revised to include additional mobile identity information elements (IE). FIG. 8 illustrates a table 800 describing a format for a location updating request message according to aspects of the invention. As described in table 800, a location updating request message may include a mobility management protocol discriminator, skip indicator, and location updating message type. In one aspect, a location updating request message may also include a mandatory first Mobile Identity 802. The first mobile identity 802 may be an indication of an IMSI or a TMSI. The location updating request message may further include at least one Additional Mobility Identity 804 (denoted as Additional Mobility Identity-1 . . . . Additional Mobility Identity-k). For example, the at least one Additional Mobility Identity 804 can indicate a second USIM and may include an indication of an IMSI or a TMSI.

Similarly, in another aspect, a ROUTING AREA UPDATE REQUEST message may be revised to include Additional Mobile Identity IEs in the message. FIG. 9 illustrates a table 900 describing a routing area update request message format. As described in table 900, a routing area update request message may include a mobility management protocol discriminator, skip indicator, and routing area update message type. In one aspect, a routing area update request message may also include a mandatory first Mobile Identity 902. The first mobile identity 902 may be an indication of an IMSI or a P-TMSI. The routing area update request message may further include at least one Additional Mobility Identity 904 (denoted as Additional Mobility Identity-1 . . . . Additional Mobility Identity-k). For example, the at least one Additional Mobility Identity 904 can indicate a second USIM and may include an indication of an IMSI or a P-TMSI.

Figure 10:
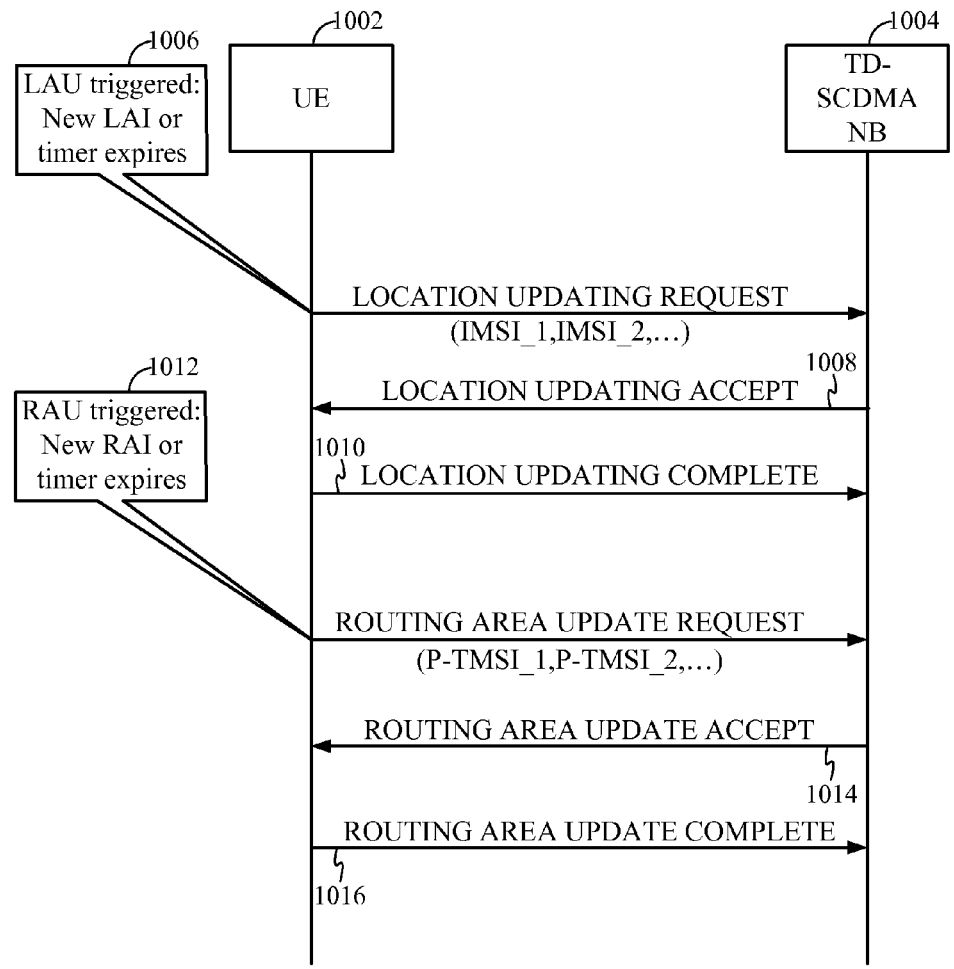
FIG. 10 is a sequence diagram illustrating an example of a UE in communication with a Node B in accordance with aspects of the present disclosure.

FIG. 10 is a sequence diagram illustrating an example of a UE 1002 performing area update procedures with a TD-SCDMA Node B 1004. Similar to the operations performed in FIG. 4, at 1006, a LAU is triggered and the UE 1002 may initiate a LAU procedure by sending a LOCATION UPDATING REQUEST message to the Node B 1004. In one aspect, the LOCATION UPDATING REQUEST message comprises a plurality of mobile identifiers (e.g. IMSI_1, IMSI_2, . . . , etc.) At 1006, the Node B 1004 may transmit a "location updating accept" response to the UE 1002. At 1010, the UE 1002 may transmit a "location updating complete" message to the Node B 1004.

Similarly, in another aspect, an UE 1002 may perform a RAU procedure with a TD-SCDMA NB 1004. At 1012, a RAU is triggered and the UE 1002 may initiate a RAU procedure by sending a ROUTING AREA UPDATE REQUEST message to the Node B 1004. In one aspect, the ROUTING AREA UPDATE REQUEST message may include a plurality of mobile identifiers (e.g. P-TMSI_1, P-TMSI_2, . . . , etc.). At 1014, the Node B 1004 may transmit a "routing area update accept" response to the UE 1002. At 1016, the UE may transmit a "routing area update complete" message to conclude the RAU operation.

According to one aspect of the invention, the UE may receive a timer value indicating when to periodically transmit the area update message for the first and second SIs. In one aspect, the network may also configure the UE with the same periodic timer value for performing LAU for multiple USIMs and the same periodic timer value for performing RAU for multiple USIMs. Therefore, the UE may only need to maintain two timers (one for LAU and another for RAU) for all the USIMs supported by the UE so that the timer-triggered LAU and RAU may apply to all its USIMs. As such, once a LAU or RAU is triggered, the UE may register for all its USIMs.

In one configuration, the apparatus 350 for wireless communication includes means for transmitting, from the apparatus 350 that supports multiple SIs, an area update message comprising a first indication of a first SI supported by the UE and a second indication of a second SI supported by the apparatus 350. In another configuration, the apparatus 310 for wireless communication includes means for receiving from an apparatus 350 that supports multiple SIs, an area update message comprising a first indication of a first SI supported by the apparatus 350 and a second indication of a second SI supported by the apparatus 350. In one aspect, the aforementioned means may be the processor(s) 340 and 390 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    generating, by a user equipment (UE) that supports multiple Subscriber Identity Module (SIM) cards, an area update message comprising a first indication of a first SIM card supported by the UE and a second indication of a second SIM card supported by the UE, each SIM card comprising a unique international mobile subscriber identity (IMSI);
    transmitting the area update message; and
    receiving a timer value indicating when to periodically transmit the area update message, the timer value being the same for the first SIM card and the second SIM card.

2. The method of claim 1, wherein the area update message further comprises an indication of at least a third SIM card supported by the UE.

3. The method of claim 1, wherein the area update message comprises a location area update request message.

4. The method of claim 3, wherein the first indication and the second indication comprise at least one of an IMSI or a temporary mobile subscriber identity (TMSI).

5. The method of claim 1, wherein the area update message comprises a routing area update request message.

6. The method of claim 5, wherein the first indication and the second indication comprise at least one of an IMSI or a packet temporary mobile subscriber identity (P-TMSI).

7. The method of claim 1, further comprising receiving an acknowledgement of the area update message.

8. A method of wireless communication, comprising:
receiving, from a user equipment (UE) that supports multiple Subscriber Identity Module (SIM) cards, an area update message;
processing the area update message to obtain therefrom a first indication of a first SIM card supported by the UE and a second indication of a second SIM card supported by the UE, each SIM card comprising a unique international mobile subscriber identity (IMSI); and
transmitting a timer value indicating when to periodically transmit the area update message, the timer value being the same for the first SIM card and the second SIM card.

9. The method of claim 8, wherein the area update message further comprises an indication of at least a third SIM card supported by the UE.

10. The method of claim 8, wherein the area update message comprises a location area update request message.

11. The method of claim 10, wherein the first indication and the second indication comprise at least one of an IMSI or a temporary mobile subscriber identity (TMSI).

12. The method of claim 8, wherein the area update message comprises a routing area update request message.

13. The method of claim 12, wherein the first indication and the second indication comprise at least one of an IMSI or a packet temporary mobile subscriber identity (P-TMSI).

14. The method of claim 8, further comprising transmitting an acknowledgement of the area update message.

15. An apparatus for wireless communication, comprising:
means for generating, by a user equipment (UE) that supports multiple Subscriber Identity Module (SIM) cards, an area update message comprising a first indication of a first SIM card supported by the UE and a second indication of a second SIM card supported by the UE, each SIM card comprising a unique international mobile subscriber identity (IMSI);
means for transmitting the area update message; and
means for receiving a timer value indicating when to periodically transmit the area update message, the timer value being the same for the first SIM card and the second SIM card.

16. The apparatus of claim 15, wherein the area update message further comprises an indication of at least a third SIM card supported by the UE.

17. The apparatus of claim 15, wherein the area update message comprises a location area update request message.

18. The apparatus of claim 17, wherein the first indication and the second indication comprise at least one of an IMSI or a temporary mobile subscriber identity (TMSI).

19. The apparatus of claim 15, wherein the area update message comprises a routing area update request message.

20. The apparatus of claim 19, wherein the first indication and the second indication comprise at least one of an IMSI or a packet temporary mobile subscriber identity (P-TMSI).

21. The apparatus of claim 15, further comprising means for receiving an acknowledgement of the area update message.

22. An apparatus for wireless communication, comprising:
means for receiving, from a user equipment (UE) that supports multiple Subscriber Identity Module (SIM) cards, an area update message;
means for processing the area update message to obtain therefrom a first indication of a first SIM card supported by the UE and a second indication of a second SIM card supported by the UE, each SIM card comprising a unique international mobile subscriber identity (IMSI); and
means for transmitting a timer value indicating when to periodically transmit the area update message, the timer value being the same for the first SIM card and the second SIM card.

23. The apparatus of claim 22, wherein the area update message further comprises an indication of at least a third SIM card supported by the UE.

24. The apparatus of claim 22, wherein the area update message comprises a location area update request message.

25. The apparatus of claim 24, wherein the first indication and the second indication comprise at least one of an IMSI or a temporary mobile subscriber identity (TMSI).

26. The apparatus of claim 22, wherein the area update message comprises a routing area update request message.

27. The apparatus of claim 26, wherein the first indication and the second indication comprise at least one of an IMSI or a packet temporary mobile subscriber identity (P-TMSI).

28. The apparatus of claim 22, further comprising means for transmitting an acknowledgment of the area update message.

29. A computer program product, comprising:
a non-transitory computer-readable medium comprising code for:
generating, by a user equipment (UE) that supports multiple Subscriber Identity Module (SIM) cards, an area update message comprising a first indication of a first SIM card supported by the UE and a second indication of a second SIM card supported by the UE each SIM card comprising a unique international mobile subscriber identity (IMSI); and
transmitting the area update message; and
receiving a timer value indicating when to periodically transmit the area update message, the timer value being the same for the first SIM card and the second SIM card.

30. The computer program product of claim 29, wherein the area update message further comprises an indication of at least a third SIM card supported by the UE.

31. The computer program product of claim 29, wherein the area update message comprises a location area update request message.

32. The computer program product of claim 31, wherein the first indication and the second indication comprise at least one of an IMSI or a temporary mobile subscriber identity (TMSI).

33. The computer program product of claim 29, wherein the area update message comprises a routing area update request message.

34. The computer program product of claim 33, wherein the first indication and the second indication comprise at least one of an IMSI or a packet temporary mobile subscriber identity (P-TMSI).

35. The computer program product of claim 29, further comprising code for receiving an acknowledgement of the area update message.

36. A computer program product, comprising:
a non-transitory computer-readable medium comprising code for:
receiving, from a user equipment (UE) that supports multiple Subscriber Identity (SIMs) Module (SIM) cards, an area update message; and
processing the area update message to obtain therefrom a first indication of a first SIM card supported by the UE and a second indication of a second SIM card supported by the UE each SIM card comprising a unique international mobile subscriber identity (IMSI); and transmitting a timer value indicating when to periodically transmit the area update message, the timer value being the same for the first SIM card and the second SIM card.

37. The computer program product of claim 36, wherein the area update message further comprises an indication of at least a third SIM card supported by the UE.

38. The computer program product of claim 36, wherein the area update message comprises a location area update request message.

39. The computer program product of claim 38, wherein the first indication and the second indication comprise at least one of an IMSI or a temporary mobile subscriber identity (TMSI).

40. The computer program product of claim 36, wherein the area update message comprises a routing area update request message.

41. The computer program product of claim 40, wherein the first indication and the second indication comprise at least one of an IMSI or a packet temporary mobile subscriber identity (P-TMSI).

42. The computer program product of claim 36, further comprising code for transmitting an acknowledgment of the area update message.

43. An apparatus for wireless communication, comprising:
  at least one processor; and
  a memory coupled to the at least one processor,
  wherein the at least one processor is configured to:
  generate an area update message comprising a first indication of a first Subscriber Identity Module (SIM) card supported by a UE and a second indication of a second SIM card supported by the UE and transmit the area update message, each SIM card comprising a unique international mobile subscriber identity (IMSI); and
  receive a timer value indicating when to periodically transmit the area update message, the timer value being the same for the first SIM card and the second SIM card.

44. The apparatus of claim 43, wherein the area update message further comprises an indication of at least a third SIM card supported by the UE.

45. The apparatus of claim 43, wherein the area update message comprises a location area update request message.

46. The apparatus of claim 45, wherein the first indication and the second indication comprise at least one of an IMSI or a temporary mobile subscriber identity (TMSI).

47. The apparatus of claim 43, wherein the area update message comprises a routing area update request message.

48. The apparatus of claim 47, wherein the first indication and the second indication comprise at least one of an IMSI or a packet temporary mobile subscriber identity (P-TMSI).

49. The apparatus of claim 43, wherein the processor is further configured to receive an acknowledgement of the area update message.

50. An apparatus for wireless communication, comprising:
  at least one processor; and
  a memory coupled to the at least one processor,
  wherein the at least one processor is configured to:
  receive, from a user equipment (UE) that supports multiple Subscriber Identity Module (SIM) cards, an area update message and process the area update message to obtain therefrom a first indication of a first SIM card supported by the UE and a second indication of a second SIM card supported by the UE, each SIM card comprising a unique international mobile subscriber identity (IMSI); and
  transmit a timer value indicating when to periodically transmit the area update message, the timer value being the same for the first SIM card and the second SIM card.

51. The apparatus of claim 50, wherein the area update message further comprises an indication of at least a third SIM card supported by the UE.

52. The apparatus of claim 50, wherein the area update message comprises a location area update request message.

53. The apparatus of claim 52, wherein the first indication and the second indication comprise at least one of an IMSI or a temporary mobile subscriber identity (TMSI).

54. The apparatus of claim 50, wherein the area update message comprises a routing area update request message.

55. The apparatus of claim 54, wherein the first indication and the second indication comprise at least one of an IMSI or a packet temporary mobile subscriber identity (P-TMSI).

56. The apparatus of claim 50, wherein the processor is further configured to transmit an acknowledgement of the area update message.

* * * * *